United States Patent [19]

Akre

[11] Patent Number: 4,783,953
[45] Date of Patent: Nov. 15, 1988

[54] LAYING OF A TUBE CONTAINING TRANSMISSION ELEMENTS ONTO A SUPPORT FILAMENT

[75] Inventor: Collin A. Akre, Clavet, Canada

[73] Assignee: Northern Telecom Limited, Montreal, Canada

[21] Appl. No.: 102,990

[22] Filed: Sep. 30, 1987

[51] Int. Cl.⁴ .................. G02B 6/10; G02B 6/16; H01B 13/02
[52] U.S. Cl. .................. 57/9; 57/6; 57/13; 57/352; 350/96.23
[58] Field of Search .................. 57/59, 138, 13–18, 57/352, 7; 350/96.23; 156/51–56

[56] References Cited

U.S. PATENT DOCUMENTS

| | | | |
|---|---|---|---|
| 4,325,212 | 4/1982 | Hope | 57/9 X |
| 4,347,697 | 9/1982 | Hope et al. | 57/9 |
| 4,384,446 | 5/1983 | Hope et al. | 57/6 |
| 4,483,134 | 11/1984 | McKay et al. | 57/9 X |
| 4,635,430 | 1/1987 | Missout et al. | 57/6 |

Primary Examiner—John Petrakes
Attorney, Agent, or Firm—R. J. Austin

[57] ABSTRACT

A laying head for laying a tube containing an optical fiber onto the outer surface of an elongate support. An upstream end of the laying head provides an inlet for the support and a guide passage for guiding the tube into a chamber of the laying head. The chamber extends around the passline for an angular distance greater than that of the guide passage to allow lateral movement of the tube within the head. The tube passes from the chamber onto the surface of the support as the support exits the chamber. The chamber allows for lateral tube movement to enable the tube to be laid onto the support in spiral fashion with the tube causing the head to rotate around the support.

13 Claims, 5 Drawing Sheets

LAYING OF A TUBE CONTAINING TRANSMISSION ELEMENTS ONTO A SUPPORT FILAMENT

This invention relates to the laying of a tube containing transmission elements onto a support member.

It is known to construct a telecommunications cable having an elongate support member formed on its outer surface with one or more grooves which carry elongate telecommunications transmission members. An optical cable is an example of such a telecommunications cable in which the transmission members are optical fibers. To enable the cable to be flexed during storage, installation and use while preventing tensions being applied to the fibers, it is common practice for the grooves to extend longitudinally of the cable while lying at an angle to the axis of the support member. In one accepted manner of doing this, the grooves extend in true helical fashion along the support member. Alternatively, the grooves extend along the support member in sinusoidal manner, i.e. one in which the grooves extend around the support member, alternately in one direction and then in the other. With the sinusoidal arrangement, the grooves normally do not complete a revolution around the support member in either direction.

In the manufacture of optical cables with support members having their grooves extending in true helical fashion, it is common for the optical fibers to be supplied from supply reels located in a storage station and for these to be rotated around the axis of the support member as the fibers are fed into the grooves. This type of arrangement is shown in U.S. Pat. Nos. 4,309,864 granted Jan. 12, 1982; 4,382,732 granted May 10, 1983; and 4,411,130 granted Oct. 25, 1983. Apparatus of this type includes a laying head for directing the optical fibers into the grooves of the support filament, the laying head being continuously rotated in one direction to align the optical fibers with the grooves during laying.

Alternatively, with the use of the sinusoidal groove arrangement, the laying head is rotated alternately in one direction and then in the other to lay the fibers into the grooves. Because of this alternating direction of movement, the fiber supply reels may be held in stationary locations without causing any laying problems. Apparatus and methods for the production of such cables are described in U.S. Pat. Nos. 4,205,899 granted June 3, 1980; 4,154,049 granted May 15, 1979; 4,195,468 granted Apr. 1, 1980; and 4,248,035 granted Feb. 3, 1981. Further patents for laying optical fibers into sinusoidal grooves include U.S. Pat. Nos. 4,347,697 granted Sept. 7, 1982 and 4,384,446 granted May 24, 1983. In the above patents and also in commercial practice, the optical fibers are laid into the grooves of support members by guiding the optical fibers through guide passages which are directly aligned with the grooves.

Suggestions have now been made for the location of transmission members in grooves in which the transmission members comprise tubes containing fibers. The apparatus described in the above patents and in common use for laying optical fibers into the grooves of a support member are unsuitable for laying tubes containing optical fibers into such grooves. This is because the tubes, as they emerge from their guide passages bend into the grooves at bend radii below an acceptable minimum for the tubes.

The present invention seeks to provide an apparatus and method for laying tubes containing transmission elements onto the outer surface of an elongate support member which avoids the above problems. Such an apparatus and method are useful not only for laying the tubes onto grooved or ungrooved outer surfaces of an elongate support member.

According to one aspect of the present invention there is provided an apparatus for laying a tube containing a transmission element along an outer surface of an elongate support member while passing the tube around the member, the apparatus comprising a laying head mounted around a passline for the support member, the laying head defining a chamber and having an upstream end part rotatable around the passline and defining an inlet for passage of the support member into the chamber and a guide passage positioned radially outwards from the inlet for guiding the tube into the chamber, the chamber subtending a larger angle around the passline than the guide passage to permit lateral movement of the tube relative to the laying head and angularly around the passline, the head also having a downstream end part defining an outlet for passage of the support member from the chamber, the head providing a circular entrance defining edge to the outlet from the chamber for urging the tube inwards towards the passline and onto the outer surface of the support member while enabling the tube during its lateral movement to slide along the edge and around the feedpath.

In a practical construction, the chamber completely surrounds the feedpath. However, the chamber may extend only partly around the passline while providing the function of enabling freedom of lateral movement of the tube.

In a preferred apparatus for laying a plurality of tubes each containing a transmission element onto the outer surface of the support member, the chamber completely surrounds the passline and the upstream end part defines a plurality of guide passages located in spaced apart positions around the inlet for guiding the tubes in spaced positions into the chamber. In one construction for locating the tubes upon an ungrooved outer surface of a support member, a driving means is operably connected to the upstream end part for controllably rotating it around the passline. Such an apparatus may be used for laying tubes helically around the outer surface of the support member in which case the driving means will operate continuously in one direction. It would be necessary in such a case for the supplies of the tubes to be rotated around the passline together with the upstream end part of the laying head. Alternatively, the driving means is operable for rotating the upstream end part for a certain angular distance around the passline alternately in one direction and then in the other. This arrangement would enable the tubes to be laid upon an ungrooved outer surface of the support member first in one direction and then in the other. The downstream end part of the laying head may be secured in position with the upstream end part rotatable relative to it. Preferably, however, the upstream and downstream end parts of the laying head are secured together and both parts are rotatable by the driving means.

In apparatus for laying a tube into a groove which extends along the outer surface of the support member, the upstream end part is freely rotatable around the passline. With this construction, the tube passing into the groove applies lateral force to the upstream end part by virtue of the contact of the tube with the sides of the guide passage, thereby moving the upstream end part in the direction of movement of the groove around the passline.

According to a further aspect of the invention there is provided a method of laying a tube containing a transmission element along the outer surface of an elongate support member with the tube passing around the member, the method comprising: passing the support member along a passline through an inlet of a rotatable upstream end part of a laying head, through a chamber of the laying head and out through an outlet in a downstream end part of the laying head, the outlet having a circular entrance defining edge from the chamber, while simultaneously guiding the tube through a guide passage and into the chamber at a position radially outwards from the support member, passing the tube through the chamber and urging it radially inwards onto the support member and then through the outlet with the tube being allowed to move laterally of the laying head and angularly around the passline progressively from the guide passage to the outlet as it travels through the chamber and at the circular entrance defining edge to the outlet.

Generally speaking when the tube is to be laid into a groove which extends along and passes around the support member, the tube is urged into the groove at the circular entrance defining edge to the outlet with the movement of the support member along the passline causing an angular displacement of the groove around the passline at the entrance to the outlet, said displacement effecting the lateral movement of the tube in the chamber and sliding movement of the tube along the edge, the lateral movement of the tube causing rotation of the upstream end part of the laying head in the direction of the lateral movement.

Alternatively, where the tube is to be laid along the outer ungrooved surface of a support member, then the upstream end part of the laying head is caused to rotate to effect rotation of the tube around the support member. This rotation causes the rotation of the tube in the chamber to lag behind the rotation of the upstream end part whereby the tube slides along the circular entrance defining edge at the outlet.

Embodiments of the invention will now be described, by way of example, with reference to the accompanying drawings, in which.

Figure 1:
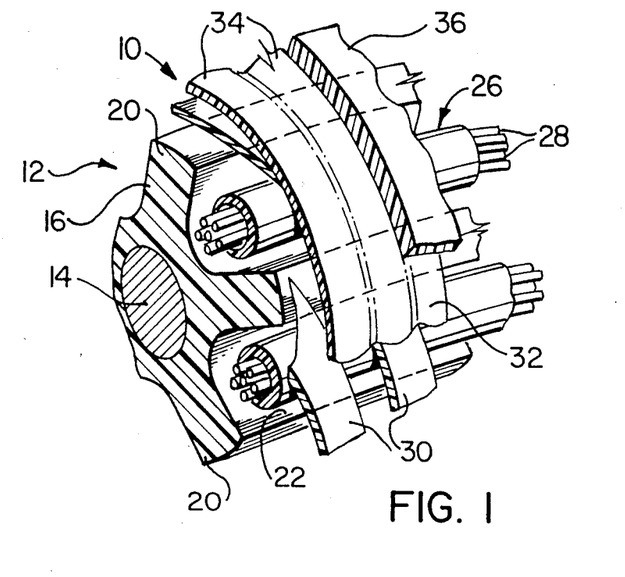
FIG. 1 is an isometric view of part of an optical cable of one construction.
Figure 2:
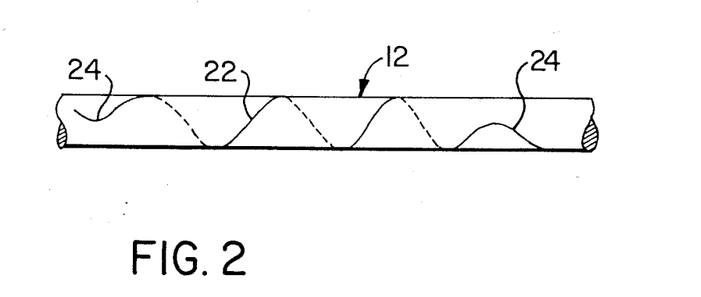
FIG. 2 is a side elevational view on a scale smaller than FIG. 1, showing the path followed by one of a plurality of grooves formed in a support member of the cable of FIG. 1.

In FIG. 1 is shown an optical cable in the manufacture of which apparatus according to a first embodiment is to be used as will be described. The optical cable 10 comprises a central support member 12 which consists of a flexible metal or fiberglass tensile member 14 and a surrounding extruded plastics cover 16 for the tensile member. The cover 16 is formed with ribs 20 which extend basically in an axial direction of the support member, the ribs 20 defining between them grooves 22 in the surface of the support member. As shown by FIG. 2, each of these grooves extends along the outer surface of the support member while passing circumferentially for more than one revolution around the support member, alternately in one direction and then in the other. For clarity, FIG. 2 illustrates part of the path of only one of the grooves 22. As can be seen from FIG. 2, the grooves each extend for approximately three revolutions in one direction around the support member and then at positions 24, change direction to extend around the support member for approximately three revolutions in the other direction. Each of the grooves 22 houses a tube 26 surrounding a plurality of transmission elements in the form of optical fibers or waveguides 28. Around the support member is applied a conventional binding tape 30, a conventional metal shield 32 formed with corrugations 34, and an outer surrounding jacket 36 of polymeric material such as PVC or polyethylene. The first embodiment is concerned with an apparatus and a method of manufacture for laying the tubes 26 containing the optical fibers into the grooves.

Basically the apparatus of the first embodiment is similar to that described in copending patent application Ser. No. 102,989, inventor C. A. Akre, title "Laying of Elongate Telecommunications Transmission Members onto Support Members" filed concurrently with this application. The apparatus will be generally described followed by a more detailed discussion of the part of the apparatus embodying the present invention.

Figures 3, 4:
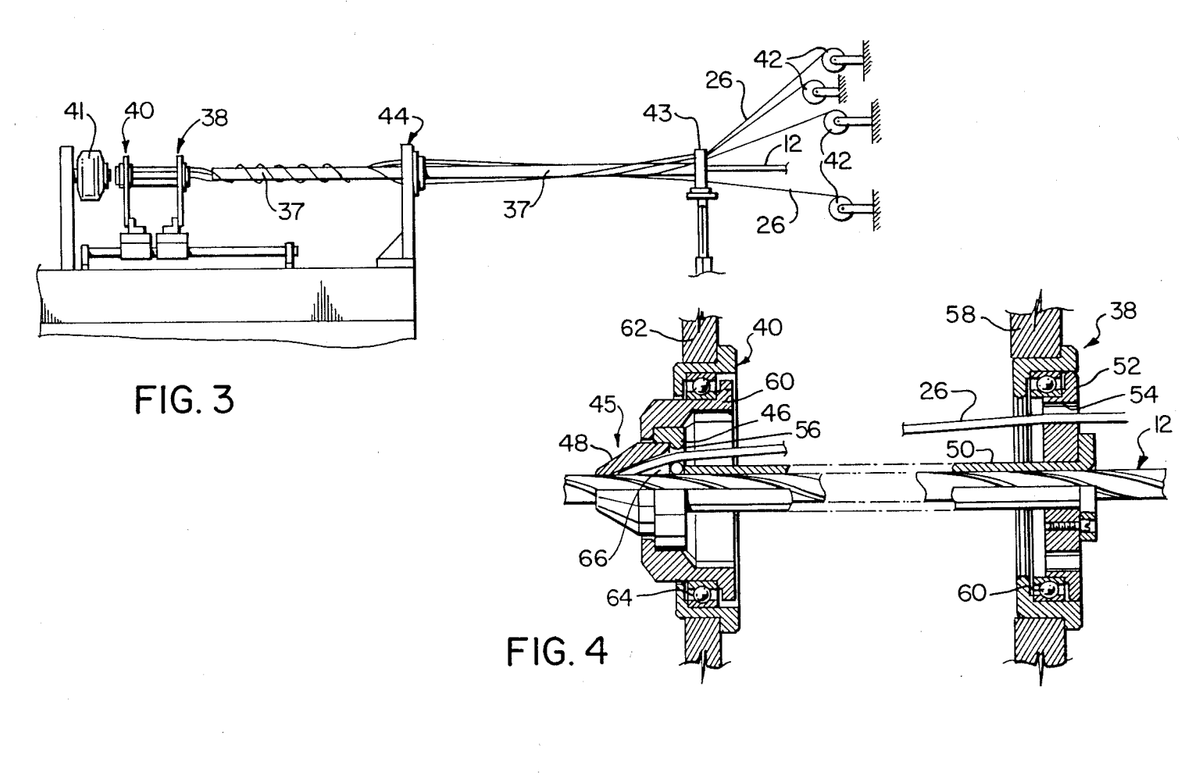
FIG. 3 is a side elevational view, on a much reduced scale, of apparatus according to a first embodiment for laying tubes containing optical fibers into the grooves formed in the support member.
FIG. 4 is a side elevational view, partly in cross-section and to a much larger scale than FIG. 3, of a combined laying means and alignment device of the apparatus with the apparatus in use.

As can be seen from FIG. 3, the support member 12 into which the tubes are to be laid is fed along its passline through a tube 37. At the downstream end of the tube 37, the support member 12 continues through an alignment device 38 and then through a laying means 40 before proceeding through a conventional core wrap applying means 41.

The tubes 26 are supplied from reels 42 held in stationary mounting positions at an upstream end of the apparatus. The tubes are then passed through guide apertures in a fixed positioning device 43 which surrounds the upstream end of the tube 37. The guide apertures in the positioning device 43 are equally spaced apart around the tube 37 so as to provide for an even distribution of the tubes around the support member 12. Tubes 26 then proceed in a downstream direction of the passline and radially outwardly from tube 37 to an angularly adjustable positioning device 44 which also surrounds the tube 37 and is provided with evenly spaced guide apertures (not shown) around the tube 37. The adjustment device 44 is useful in case the support member 12 has its grooves 22 formed so that they do not extend angularly for the same distance in each direction around the support member, i.e. a precession of the grooves takes place around the support member. The adjustable device 44 may then be moved slightly in the direction of the precession so as to prevent tightening of the tubes 26 around the tube 37 as they proceed towards the alignment device 38. As shown by FIG. 3, the adjustable device 44 is angularly adjusted around the tube 37 so that a slight twist in the tubes 26 takes place around the tube 37 upstream from the device 44. This is fully described in the copending application Ser. No. 102,989.

The alignment device 38 is part of an assembly with the laying means 40. This is shown in FIG. 4. The laying means 40 comprises a laying head 45 consisting of two parts, namely an upstream end part in the form of a plate 46 and a downstream end part which is a frusto-conical member 48. The plate 46 and the member 48 are secured together so as to rotate as one element. The construction and operation of the laying head 45 will be described in more detail below. A driving tube 50 is secured coaxially to the plate 46 so as to closely surround the support member 12 on its feedpath. The tube 50 extends upstream from the laying means and is secured at its other end to a guide plate 52 of the alignment device. The tube 50 ensures that alignment passages 54 in the guide plate 52 are continuously axially aligned each with one of a plurality of guide passages 56 in the plate 46 of the laying head. The guide passages 56 are equally spaced apart around the tube 50 for guiding the tubes 26 in equally spaced positions through the head and onto the support member 12 as will be described. The guide plate 52 is rotatably mounted in a frame 58 by means of a bearing 60.

The laying head 45 is securely held within a housing 60 which in turn is rotatably mounted in a frame 62 by bearing 64.

The head 45 will now be described in more detail in relation to its features which are concerned with aspects of the present invention. The frusto-conical member 48 defines a generally frusto-conical chamber 66 which tapers towards its downstream end, as shown particularly in FIG. 5. The chamber concentrically surrounds the passline for the support member 12. The plate 46 defines a concentric inlet 68 for passage of the support member 12 into the upstream end of chamber 66 and the guide passages 56 also open into the upstream end of the chamber. As can be seen from FIG. 5, as the chamber 66 completely surrounds the passline, then it subtends a larger angle around the passline than each guide passage 56. The frusto-conical member 48 defines an outlet 70, at its smaller diameter and downstream end, for passage of the support member 12 out of the chamber. The outlet 70 is of circular shape and the member 48 is provided with a circular entrance defining edge 72 for the outlet, the edge 72 formed by a small blending radius between the surface of the outlet 70 and the inner frusto-conical surface 74 of the member 48.

Figures 5, 6:
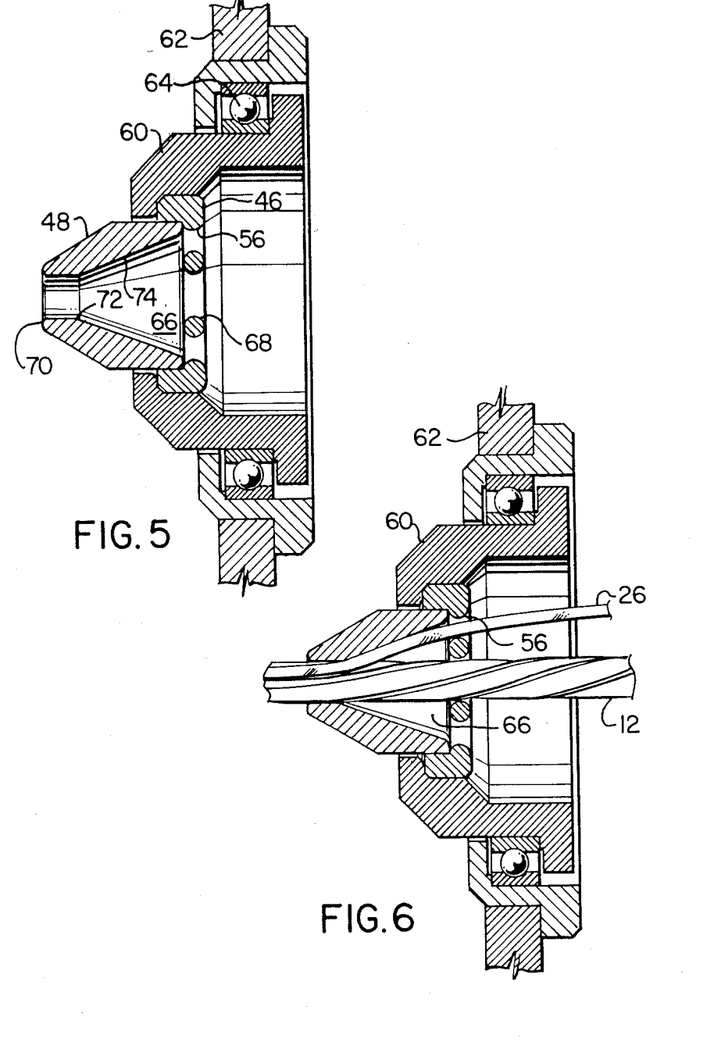
FIG. 5 is a view similar to FIG. 4 with the apparatus not in use.
FIG. 6 is a view similar to FIG. 5 of part of the laying means to a larger scale than FIG. 5 and with the apparatus in use.

In use of the apparatus, the support member 12 is fed through the tube 37 in the manner described above and then through the alignment device 38 and the laying head 45. The position of the support member 12 in the laying head is shown in FIG. 6. As can be seen, the support member passes through the inlet 68, through the chamber 66, and out through the outlet 70. The inlet and outlet of the laying head allow for sliding passage of the support member through them. Each of the tubes 26 is passed from the alignment device, through a respective guide passage 56, and through the chamber 66, as shown in FIG. 6. The passage of each of the tubes 26 is not closely controlled by the laying head angularly around the passline as in conventional laying equipment for optical fibers, as the tubes move into the grooves 22 of the support member. Instead, the tubes 26 are only restricted from having substantial angular movement around the passline at a position spaced a substantial distance from the outlet 70, i.e. when moving through the passages 56. Between the passages 56 and the outlet 70, each of the tubes 26 lies within the chamber 66 which allows for lateral movement of the tubes 26, i.e. angularly around the passline. Surface 74 of the member 48 urges each of the tubes 26 inwardly towards the support member and, as the tubes 26 pass around the circular entrance defining edge 72 to the outlet 70, then they are urged radially into the grooves themselves. Thus, the grooves themselves draw the tubes directly into them as the support member 12 moves along its passline. Because of the close tolerance between the outlet 70 and the support member 12, then each tube 26 cannot become displaced from its respective groove, a guide for each tube 26 being formed between the groove on the one side and the circular entrance defining edge 72 on the other.

It follows that the tubes 26 in moving into the grooves cause the laying head 44 to rotate in its bearings 64 by a lateral force applied to the surfaces of the passages 56. Each groove as it passes through the outlet 70 has an angular movement around the passline in one direction or the other at the outlet. The tubes as they enter the grooves must therefore slidably move around the inside of edge 72 by lateral movement of the tubes relative to their upstream positions as they enter the guide passages 56. This lateral movement is progressive from the passages 66 to outlet 70 whereby each tube bends gradually along the chamber 66 angularly around the passline. The lateral movement of the tubes around the passline places a lateral force in an appropriate position upon the surface of each of the guide passages 56 so that the tubes 26 urge the laying head in the direction of displacement of the grooves as they move through the outlet 70. Thus the tubes 26 provide a means for rotating the laying head and, because of the bending action in the tubes within the chamber 66 and their sliding movement along the edge 72, then the rotation of the laying head lags behind the angular displacement of the grooves in whichever direction this angular displacement takes place.

Figure 7:
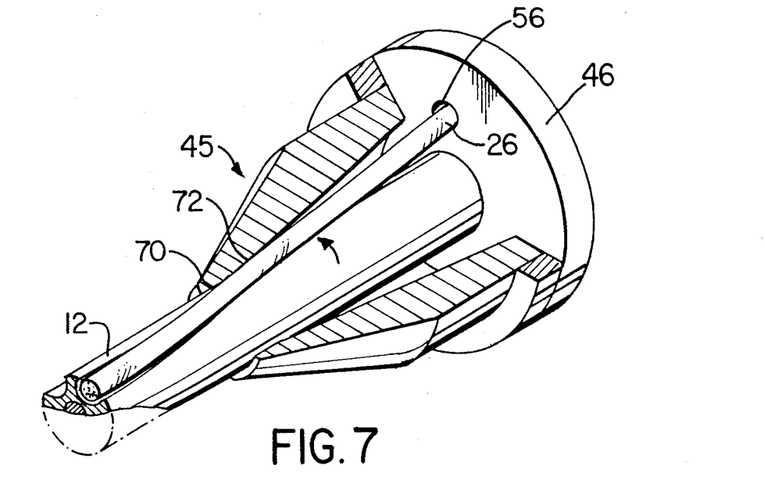
FIGS. 7 and 8 are isometric cross-sectional views through the laying means and showing the laying head at two different stages of operation.
Figure 8:
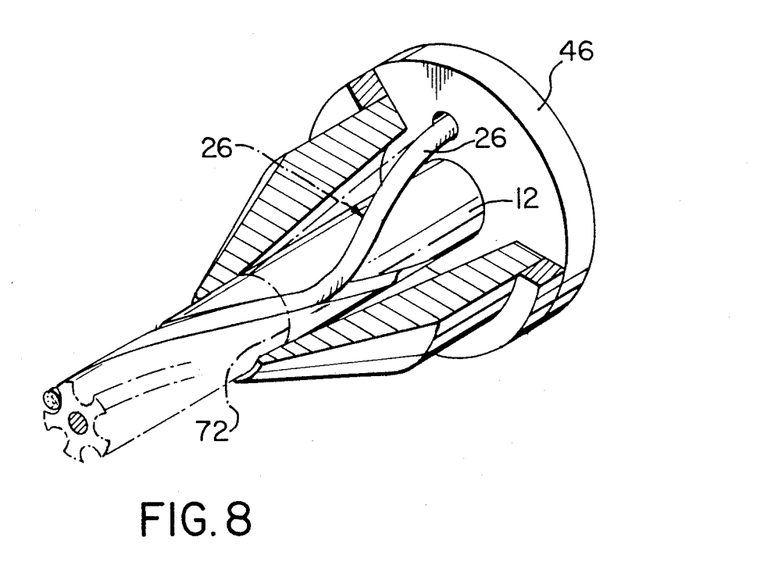

FIGS. 7 and 8 illustrate the type of action which takes place within the chamber 66. As can be seen from FIG. 7, the support member 12 is progressing through the laying head 45. The grooves as they move through the outlet 70 are in such a position at this stage of laying that they are almost axially aligned with the corresponding guide passages 56. As a result, the tubes 26 extend almost in an axial direction from the guide passages and into the grooves at the position of the edge 72. However, as the grooves progress around the support member and they become angularly displaced with regard to the edge 72, as shown in FIG. 8, then each of the tubes 26 is forced to rotate with the grooves causing the tubes to bend out of their previous position illustrated in FIG. 7. FIG. 8 indicates the tube position in FIG. 7 by the chain dotted line 26. As can be seen, this lateral displacement is circumferentially around the passline with each tube engaging the edge 72 at progressively changing positions. In the section of FIG. 8, the edge 72 is shown chain-dotted around support member 12. Because of the use of the laying head of the first embodiment, each of the tubes is allowed freedom to move laterally as it is being fed inwardly into its respective groove. The freedom to move laterally enables each of the tubes to bend within its own limits between the upstream position at the guide passage 56 and the downstream position at the edge 72 whereby no undue stresses or strains are placed upon the tube. FIG. 8 shows the type of progressive curvature with large bend radii followed by a tube. In other words these stresses and strains are avoided because the laying head does not rigidly control the position of the tubes as they enter the grooves.

While the above apparatus enables tubes to be laid within grooves of a support member without causing damage to the tubes and/or optical fibers contained therein, the freedom of lateral movement for the tubes provided by the laying head does enable the tubes to be laid within grooves with a relatively short lay length, e.g. around 100 millimeters along the support member. Laying of the tubes may be performed at a commercially acceptable speed of around 100 ft/min.

The apparatus described in the first embodiment may also be used for laying cable into grooves which pass around the support member at different angular distances from that shown. For instance, each of the grooves may extend around the support member for less than a complete revolution in each direction.

Figure 9:
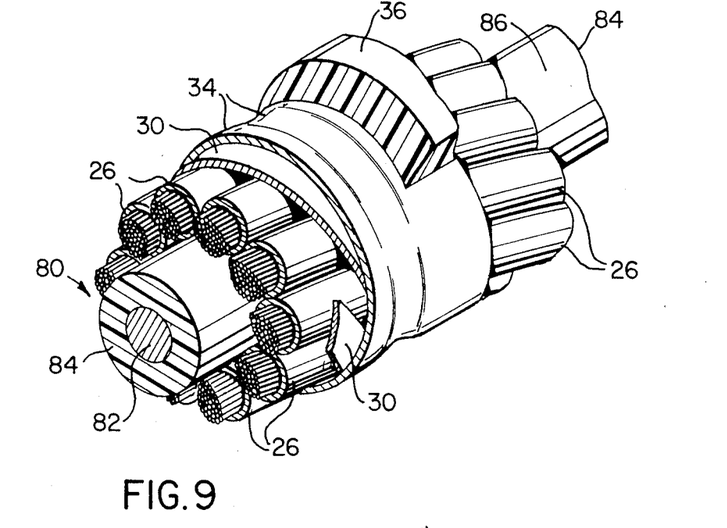
FIG. 9 is a view similar to FIG. 1 of a cable of another construction.

The apparatus described in the first embodiment may be also used for laying tubes containing optical fibers onto the outer ungrooved surface of a support member during the manufacture of an optical cable. As shown by FIG. 9, a support member 80 has a central reinforcing tensile member 82 surrounded by a plastics extruded sheath 84 having an ungrooved outer surface 86. Tubes 26 are laid upon the outer surface in a sinusoidal manner, i.e. extending along the length of the support member while passing around the support member alternately in one direction and then in the other.

Figure 10:
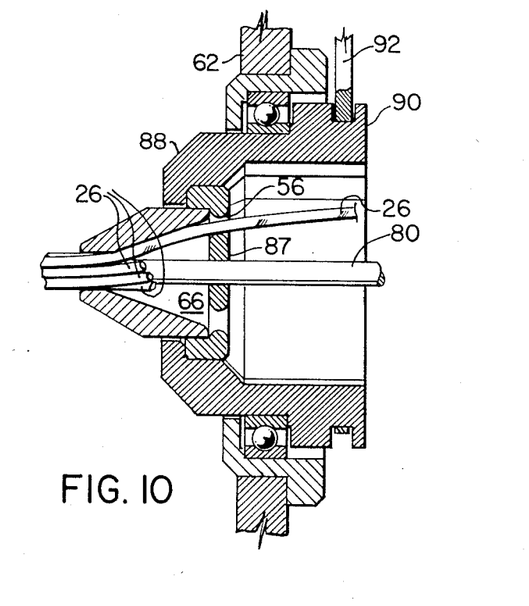
FIG. 10 is a view similar to FIG. 5 of part of an apparatus according to a second embodiment for use in the manufacture of the cable of FIG. 9.

The apparatus for laying the tubes upon the support member 80 may be similar to that described in the first embodiment except that in the second embodiment, the laying head is slightly different. This is illustrated by FIG. 10 in which the same reference numerals are used for similar parts as in the first embodiment. As shown by FIG. 1, a driving means is provided for driving the plate 87 and thus the conical member 48 of the laying head. As can be seen from that figure, the housing 60 of the first embodiment is replaced by a housing 88 in the second embodiment, this housing extending rearwardly beyond the frame 62 to form a pulley wheel 90. Around the pulley wheel extends a pulley 92 which is drivable by a reversing drive motor (not shown). In use and with the support member 80 passing through the laying head, the outlet 70 provides only sufficient clearance to enable the support member to pass through with the tubes 26 closely lying side-by-side upon its outer surface. Rotation of the laying head by virtue of the reversing drive motor causes rotation of the tubes 26 around the support member in one direction or the other. As this rotation takes place, the parts of the tubes at any instant lying within the chamber 66 are allowed to move laterally, i.e. circumferentially of the support member. Thus, the tubes 26 are laid on the outer surface of the support member as the tubes pass around the edge 72 and at this position rotationally they lag behind their respective passages 56 with the tubes bending with large acceptable bend radii within the chamber. This bending action is similar to that described in the second embodiment with regard to FIGS. 7 and 8 except that in this case the rotational drive is provided by the laying head itself as distinct from being provided by the grooves of the support member in the first embodiment.

It is found that with the second embodiment, it is a simple operation to lay the tubes upon the support member 80 without any undue stresses or strains in the tubes. Furthermore, it is possible to lay the tubes in a reversing manner upon the support member and to retain them in these positions if the binding tape is applied around the tubes from the binding head 41 directly after emergence of tubes and support member from the outlet to the binding head.

What is claimed is:

1. Apparatus for laying a tube containing a transmission element along the outer surface of an elongate support member with the tube passing around the support member, the apparatus comprising a laying head mounted around a passline for the support member, the laying head defining a chamber and having an upstream end part rotatable around the passline and defining an inlet for passage of the support member into the chamber and a guide passage positioned radially outwards from the inlet for guiding the tube into the chamber, the chamber subtending a larger angle around the passline than the guide passage and being unrestricted around the passline to permit lateral movement of the tube relative to the laying head and angularly around the passline, the head also having downstream end part defining an outlet for passage of the support member from the chamber, the head providing a circular entrance defining edge to the outlet from the chamber for urging the tube inwards towards the passline and onto the outer surface of the support member while enabling the tube during its lateral movement to slide along the edge and around the feedpath.

2. Apparatus according to claim 1 wherein the upstream end part of the laying head comprises a plate extending across the passline and defining the inlet and the guide passage, and the downstream end part comprises a chamber defining element.

3. Apparatus according to claim 2 wherein the downstream end part defines the chamber as a frusto-conical chamber which tapers from an upstream end to the outlet at the downstream end.

4. Apparatus according to claim 1 for laying a plurality of tubes onto the outer surface of a support member, each tube containing a transmission element, wherein the upstream end part defines a plurality of guide passages located in spaced apart positions around the inlet for guiding the tubes into the chamber which surrounds the passline.

5. Apparatus according to claim 4 wherein the upstream end part of the laying head is rotatable around the passline and a driving means is operably connected to the upstream end part for rotating the upstream end part for a certain angular distance around the passline alternately in one direction and then in the other.

6. Apparatus according to claim 5 wherein the upstream and downstream end parts of the laying head are secured together and both end parts are rotatable by the driving means.

7. Apparatus according to claim 1 wherein the upstream end part is freely rotatable relative to a frame holding the head to enable the upstream end part to rotate freely around the passline for laying a tube into a groove which extends along the outer surface of the support member while passing circumferentially around the passline.

8. Apparatus according to claim 7 wherein the upstream and downstream end parts of the laying head are secured together and both end parts are freely rotatable relative to the frame.

9. A method of laying a tube containing a transmission element along the outer surface of an elongate support member while passing around the member, the method comprising passing the support member along a passline through an inlet in a rotatable upstream end part of a laying head, through a chamber of the laying head and out through an outlet in a downstream end part of the laying head, the outlet having a circular entrance defining edge from the chamber, while simultaneously guiding the tube through a guide passage and into the chamber at a position radially outwards from the support member, the chamber subtending a larger angle around the passline than the guide passage, passing the tube through the chamber and urging it radially inwards onto the support member and then through the outlet with the chamber providing an unrestricted freedom of movement to the tube angularly nd the passline relative to the guide passage, the tube extending angularly around the passline progressively from the guide passage to the outlet as it travels through the chamber and at a circular entrance defining edge to the outlet.

10. A method according to claim 9 for laying the tube into a groove which extends along the outer surface of the support member while passing around the member, comprising urging the tube into the groove at the circular entrance defining edge to the outlet with the movement of the support member along its passline causing a continuous angular displacement of the groove around the passline at the entrance to the outlet, said displacement effecting the lateral movement of the tube in the chamber and sliding movement of the tube along the edge, the lateral movement of the tube effecting rotation of the upstream end part of the laying head to follow said lateral movement.

11. A method according to claim 10 wherein the groove passes around the support member alternately in one direction and then in the other, the tube passing into the groove by moving laterally relative to the laying head alternately in one direction and then in the other direction, movement in each direction followed by rotation of the upstream end part of the laying head in that direction.

12. A method according to claim 9 comprising laying the tube along the outer surface of the support member, said surface formed without grooves, comprising positively rotating the upstream end part of the laying head to rotate the tube around the support member, said rotation causing the tube within the chamber to rotate in the same direction while lagging behind the rotation of the upstream end part by lateral movement of the tube whereby the tube slides along the circular entrance defining edge of the outlet as the tube is urged onto the support member.

13. A method according to claim 12 comprising laying the tube along the outer surface with the tube extending around the surface alternately in one direction and then in the other comprising positively rotating the upstream end part of the laying head alternately in one direction and then in the other, movement of the upstream end part in each direction causing the tube within the chamber to rotate in that direction while lagging behind the rotation of the upstream end part.

* * * * *